United States Patent
Sylvia et al.

(10) Patent No.: US 7,024,866 B2
(45) Date of Patent: Apr. 11, 2006

(54) AXIAL LOADED SEAL SYSTEM WITH A STATIC L-SEAL

(75) Inventors: Russell M. Sylvia, South Dartmouth, MA (US); Allen J. Bartlett, Milford, MA (US); Mark E. Housman, North Attleboro, MA (US)

(73) Assignee: Helix Technology Corporation, Mansfield, MA (US)

( * ) Notice: Subject to any disclaimer, the term of this patent is extended or adjusted under 35 U.S.C. 154(b) by 23 days.

(21) Appl. No.: 10/734,079

(22) Filed: Dec. 11, 2003

(65) Prior Publication Data

US 2005/0126186 A1 Jun. 16, 2005

(51) Int. Cl.
*F25B 9/00* (2006.01)
*B60T 11/236* (2006.01)
*F02F 5/00* (2006.01)
*F16J 9/06* (2006.01)
*F16J 9/00* (2006.01)

(52) U.S. Cl. .............................. 62/6; 277/467; 277/473; 92/250

(58) Field of Classification Search ...................... 62/6; 92/250; 277/467, 471, 473, 531
See application file for complete search history.

(56) References Cited

U.S. PATENT DOCUMENTS

| | | | |
|---|---|---|---|
| 1,534,765 A * | 4/1925 | Briney | 277/467 |
| 3,068,012 A * | 12/1962 | Vleet | 277/385 |
| 3,572,732 A | 3/1971 | Sekulich | |
| 3,656,824 A | 4/1972 | Ullberg | |
| 3,771,799 A | 11/1973 | Sekulich et al. | |
| 3,909,166 A * | 9/1975 | Sasaki | 418/142 |
| 4,005,953 A | 2/1977 | Ruf | |
| 4,121,838 A | 10/1978 | Sakamaki | |
| 4,283,064 A | 8/1981 | Staab et al. | |
| 4,355,519 A * | 10/1982 | Kercheval et al. | 62/6 |
| 4,418,918 A | 12/1983 | Nicoll | |
| 4,560,174 A | 12/1985 | Bisi | |
| 4,707,150 A | 11/1987 | Graham | |
| 4,755,115 A | 7/1988 | Akaike | |
| 5,055,015 A | 10/1991 | Furukawa | |
| 5,121,931 A | 6/1992 | Matsushita et al. | |
| 5,183,617 A | 2/1993 | Saitoh | |
| 5,447,034 A * | 9/1995 | Kuriyama et al. | 62/51.1 |
| 5,713,579 A | 2/1998 | Petrak et al. | |

(Continued)

*Primary Examiner*—William C. Doerrler
(74) *Attorney, Agent, or Firm*—Hamilton, Brook, Smith & Reynolds, P.C.

(57) ABSTRACT

A piston includes a circumferential groove having a dynamic split seal ring having a flat axially facing surface, a static seal ring having a flat axially facing surface abutting the flat surface of the dynamic seal ring, and a spring mounted within the groove. The spring exerts an axial force on the static seal ring that serves to distribute the axial load with a static seal over the dynamic split seal, thereby preventing shuttling of the split seal within the groove and restricting the leak path of the seal. Preferably, the static seal ring is a polymer and can be an L-ring, a load ring with a flange that abuts the piston body, or flanged designs. In addition, a load ring can be fitted between the L-ring and the spring. The split seal ring has at least one radial spring mounted within the seal ring to create a radial force on the split seal ring. The piston can also include a sleeve that mounts to the piston body, the sleeve forming a wall of the groove. The piston can be a displacer mounted within a cylinder of a refrigerator.

12 Claims, 5 Drawing Sheets

U.S. PATENT DOCUMENTS

| | | |
|---|---|---|
| 5,884,919 A | 3/1999 | Saito |
| 5,956,956 A | 9/1999 | Morishita et al. |
| 6,120,037 A | 9/2000 | Schmertz |
| 6,347,800 B1 | 2/2002 | Auber |
| 6,390,666 B1 | 5/2002 | Schafer et al. |
| 6,408,631 B1 | 6/2002 | Sylvia |
| 6,485,024 B1 | 11/2002 | Pippert et al. |
| 6,543,786 B1 | 4/2003 | Osumi et al. |
| 6,583,376 B1 | 6/2003 | Kobayashi |
| 6,598,406 B1 * | 7/2003 | Sylvia .................. 62/6 |

\* cited by examiner

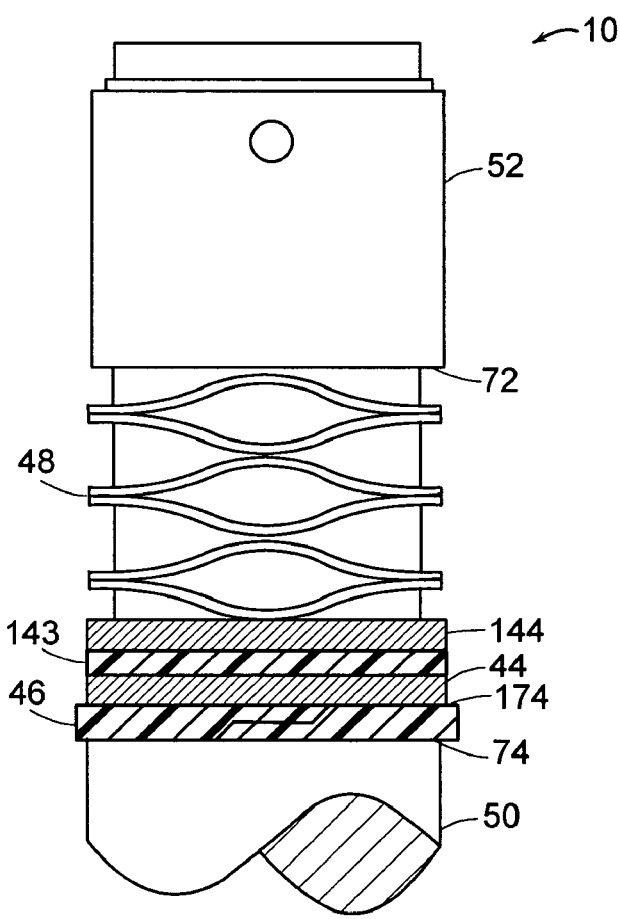
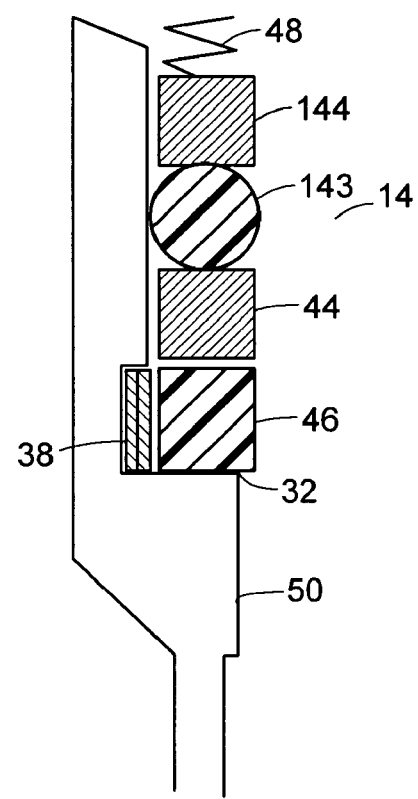
FIG. 2A
FIG. 2B

AXIAL LOADED SEAL SYSTEM WITH A STATIC L-SEAL

BACKGROUND OF THE INVENTION

In cryogenic refrigerators such as Stirling and Gifford-MacMahon type refrigerators, a piston-like displacer reciprocates within a cylinder. For efficient refrigeration in those two systems, a gas seal is provided between the displacer and cylinder to assure that refrigerant passing from one end of the displacer to the other passes through a regenerator in the displacer. One type of seal which has been widely used in such refrigerators is the split ring seal having a Z-cut there across to permit circumferential expansion of the ring without loss of sealing. The seal is positioned in a circumferential groove in the displacer and is pressed outward against the cylinder by an inner expander ring. When assembled, the split seal fits snugly within the groove. A primary advantage of such a seal in cryogenic refrigerators is that, even with wear and thermal contraction or expansion of the seal, the expander assures a fairly constant sealing force on the cylinder wall.

As shown in FIG. 1, a typical split Gifford-MacMahon or Stirling refrigerator includes a displacer 12 which reciprocates in a cylinder 14. The displacer is driven by a motor or gas spring volume through a piston rod 13 and pin connection 15. Upward movement of the displacer 12 causes high pressure gas in a warm chamber 16 to be displaced through a regenerator 18 within the displacer. The gas passes outward through a porous metal plug 20 or side ports (not shown) into a cold end expansion chamber 24. The thus cooled gas is expanded in the chamber 24 to further cool the gas and surrounding high conductivity heat station 26. Then, with downward movement of the displacer the very cold gas is returned through the regenerator 18 to cool that regenerator for cooling of gas in the next cycle of operation. To assure that all refrigerant, such as helium gas, is directed through the regenerator with movement of the displacer, the seal ring 30 is positioned in a peripheral groove in the displacer near its warm end.

The seal ring 30 is generally a split ring of plastic material such as fiber glass tetrafluoroethylene (TFE), whereas an expander ring 38 is of spring steel and the groove is usually formed in stainless steel. Thus, the seal ring 30 has a much greater coefficient of thermal expansion than do the surrounding metal parts. To allow for thermal expansion of the seal ring within the groove, rings in conventional refrigerators have a slightly smaller axial dimension than that of the groove to within 0.5 mils. Thus, except when operating at high temperatures, the seal ring shuttles within the groove along the expander ring with each change in direction of the displacer movement. During the time intervals that the seal is shifting within the groove, there is no compressive force to maintain a tight seal along a circumferential cut or Z-cut in the seal ring 30 and at a groove face. Thus, leakage is experienced with each change in direction of the displacer. Also, the seal ring must alternately seal against opposite faces of the groove. For this sealing, the faces of the seal ring and the groove must be precisely smooth, flat and parallel. Such necessary precision, makes large scale fabrication of consistently and uniformly operating devices difficult.

When the refrigerator is exposed to a cold environment, or the seal is cooled by the refrigerator itself, the seal ring shrinks and, as a result, shuttles to a greater extent along the expander ring with each reciprocating movement of the displacer. Such shuttling of the seal within the groove results in greater wear and leakage. The wear of the seal ring leads to even greater leakage around the displacer and also gives rise to debris which, when mixed with the helium refrigerant, reduces the efficiency of the refrigerator.

In U.S. Pat. No. 4,355,519, herein incorporated by reference, shuttling of the seal was prevented by the use of a spring within the displacer to produce an axial load on the seal ring. The use of a Belleville washer and an annular spring having a u-shaped or c-shaped cross section were described.

In U.S. Pat. No. 6,408,631, herein incorporated by reference, a wave spring produces the axial load on a seal ring in a piston.

U.S. Pat. No. 6,598,406, herein incorporated by reference, illustrates the use of load rings in combination with an elastomer o-ring to minimize leakage at the seal ring. Figure FIG. 2A is taken from U.S. Pat. No. 6,598,406. FIG. 2B is a cross-sectional view of the same seal assembly. A wave spring 48 provides an axial load on a load ring 144, an elastomer O-ring 143, and another load ring 44, which in turn provides an axial load onto a dynamic seal 46.

SUMMARY OF THE INVENTION

Despite the efficacy of a radially loaded dynamic ring seal that is axially loaded by a combination of load rings, static seal rings and wave springs, extreme changes in temperature in cryogenic refrigerators can cause thermal contraction of the seal rings which creates both axial and radial movement that allow leakage. In the axial loaded seal system, the "Z-cut" and the shorter backup rings still create a very small leak path. If the backup rings move during operation, delta pressure increases across the displacer, or the seal wears over time, the leak path will increase. Also, the axial load applied by the spring can potentially be overcome if differential pressure increases across the displacer. Furthermore, while the use of elastomer O-rings allows a secure radial fit since the O-rings have some elasticity, that same property makes O-rings more sensitive to damage, thus increasing the possibility of leakage in the seal.

The present invention uses a static seal ring with a flat axial facing surface over a dynamic seal ring. In one embodiment, polymer surfaces of a static seal ring and a dynamic seal ring allow movement between the two seal rings, thus minimizing a lock of the dynamic seal ring's radial movement through friction. In addition, the polymer seal ring also provides more flexibility than a metal ring with regard to fit around a displacer, while providing more rigidity and durability than an elastomer O-ring.

One embodiment of the invention includes a piston having a body having a circumferential groove, two polymer seal rings having flat axial facing surfaces and a wave spring. The groove includes a first groove wall and a second groove wall. The two seal rings are loaded toward the first groove wall, the first seal ring forming a dynamic seal, and the second seal ring forming a static seal. The wave spring is located between the seal rings and the second groove wall where and axially loads the static seal.

The static seal ring can have an L-shaped cross section ("L-ring"). A load ring can also be placed between the wave spring and the L-ring to distribute an axial load onto the static and dynamic seals. Alternatively, the static seal ring can be a flanged load ring that has a flange that abuts the piston body. Both the static seal and the dynamic seal can have flat abutting axial surfaces that allow a low friction movement between the static seal and dynamic seal.

The static polymer seal ring contracts to form a seal to the outer diameter of the displacer within the groove, restricting the flow path through the Z-cut to the inner diameter of the split seal to the opposing differential pressure region. Further, it creates a second sealing surface on an axial face of the dynamic seal and locks the axial force on the split seal independent of the spring and eliminates the spring from potentially lifting while operating at cryogenic temperatures. The use of these static polymer seal rings can relax the needed tight tolerances on the split seal, back-up ring height and load ring surface finish and could even eliminate the need for a dimpled seal.

The dynamic seal ring is preferably a split seal ring and includes at least one radial spring mounted within the seal ring to create a radial force within the seal ring. Preferably, the at least one radial spring includes a first radial spring and a second radial spring. The first radial spring includes a first opening and the second radial spring includes a second opening. The first radial spring and the second radial spring are mounted within the dynamic seal ring such that the first opening is located at approximately 180 degrees with respect to the second opening. In one embodiment, the piston includes a load ring mounted between a wave spring and an L-ring. The load ring uniformly distributes the load onto the L-ring, which in turn uniformly distributes the load onto the dynamic seal ring.

In another embodiment, the piston includes a sleeve mounted on the body where the sleeve forms the first groove wall of the circumferential groove and the body forms the second groove wall of the circumferential groove. The piston can also include a securing mechanism that secures the sleeve to the body such as a snap ring.

Another embodiment of the invention includes a refrigerator having a cylinder and the piston is a displacer mounted within the cylinder. The displacer includes a body with a circumferential groove, two polymer seal rings, and a spring. The groove includes a first groove wall and a second groove wall where the two seal rings are located against the first groove wall, the first seal ring forms a dynamic seal and the second ring forms a static seal. The spring is located between the seal rings and the second groove wall, the spring axially loading the seal rings. A load ring can also be placed between the spring and the static seal to help uniformly distribute the axial load on the static seal. The body can include a sleeve mounted on the body where the sleeve forms the first groove wall and the body forms the second groove wall. The spring can include a wave spring which axially loads the seal ring. The dynamic seal ring can include a split seal ring having at least one radial spring mounted within the split seal ring to create a radial force of the split seal ring against the cylinder.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2A is a view of a displacer having a static seal ring comprised of an o-ring positioned between two load rings, and a seal ring within a circumferential groove.

FIG. 2B is a cross-sectional view of a displacer of FIG. 2A and a seal ring at a circumferential groove.

DETAILED DESCRIPTION OF THE INVENTION

A description of preferred embodiments of the invention follows.

Figure 1:
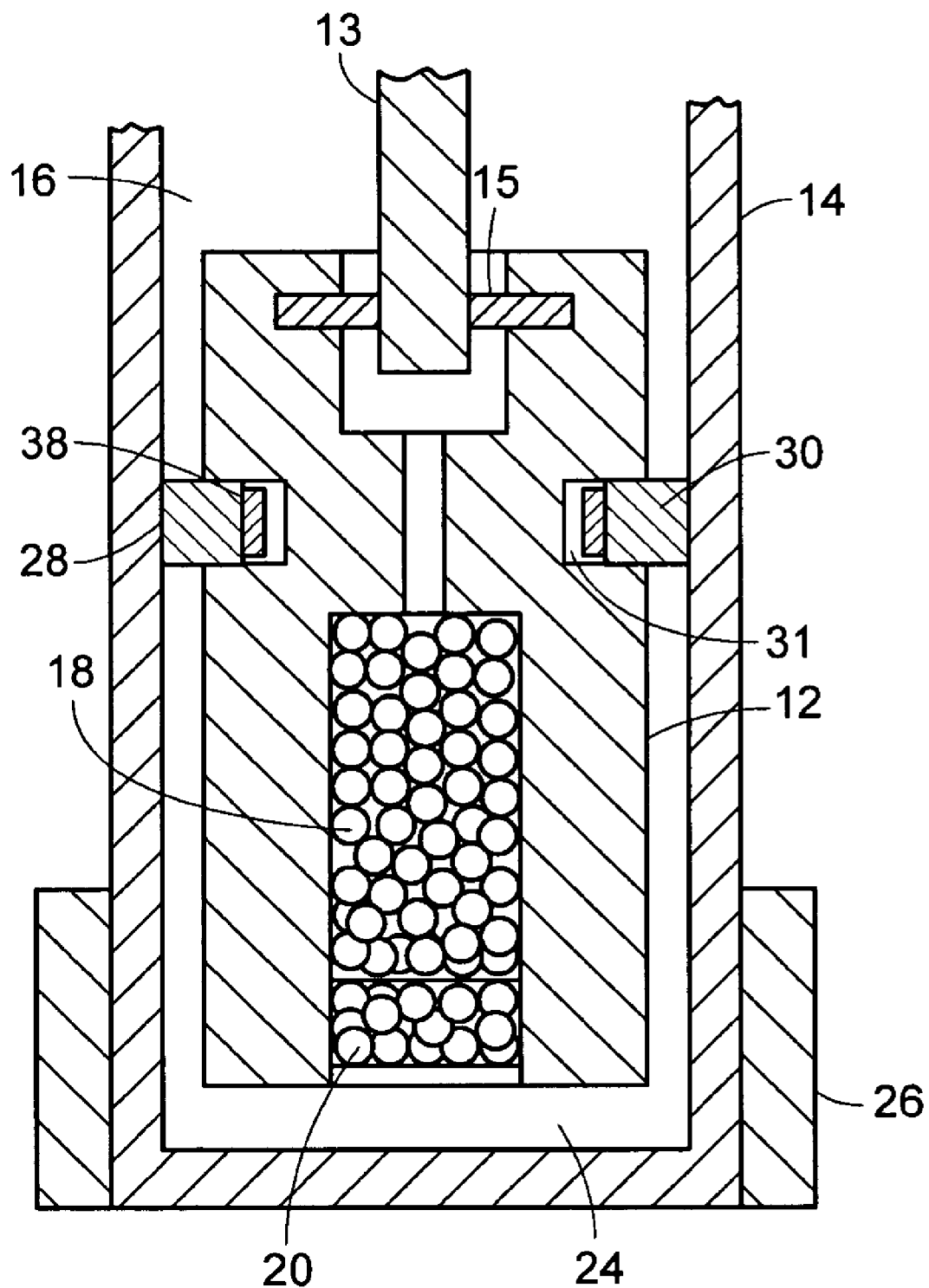
FIG. 1 is a cross-sectional view of a displacer within a cylinder.
Figure 3:
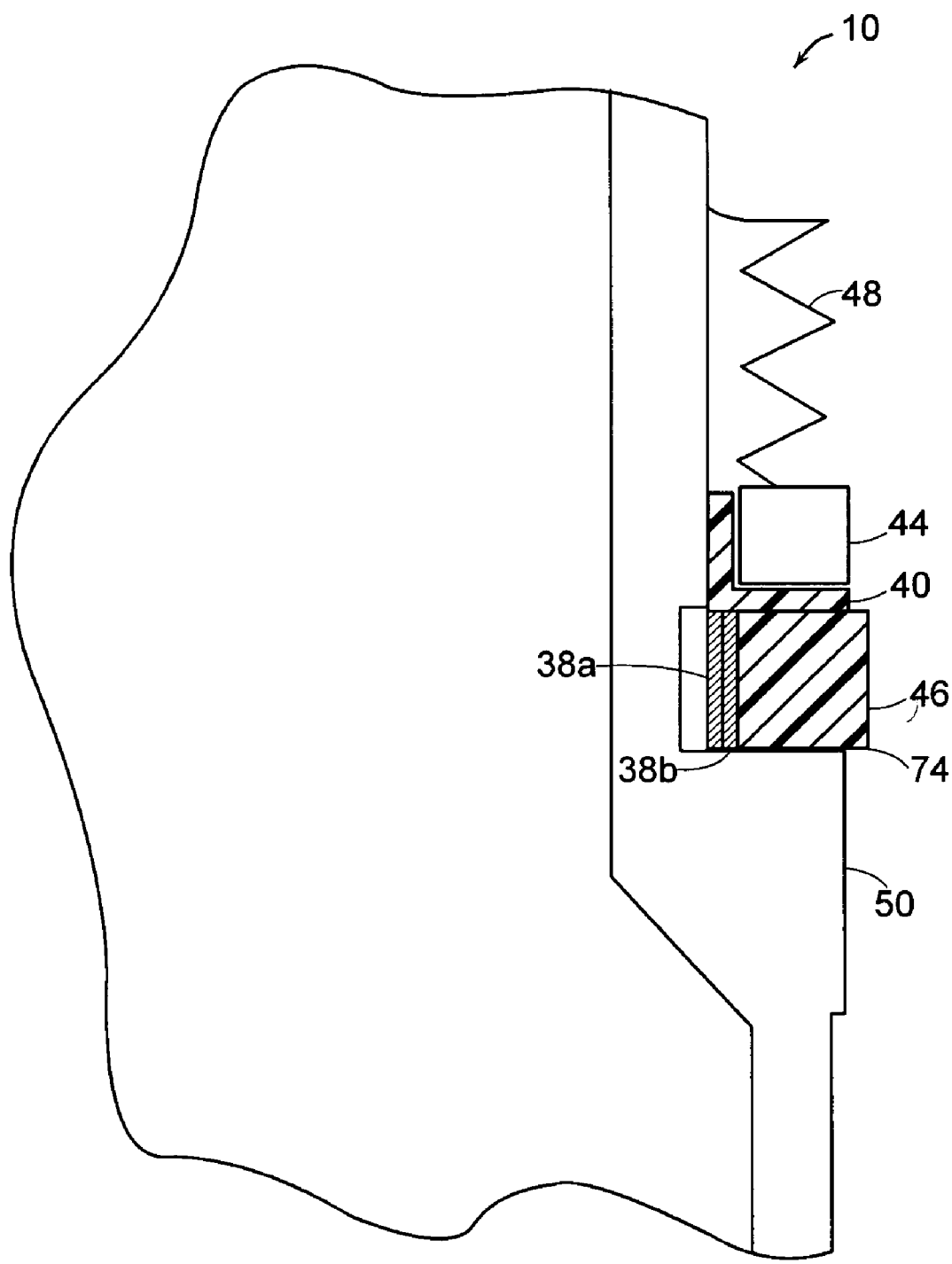
FIG. 3 is a cross-sectional view of a displacer of one embodiment of the present invention and a seal ring at a circumferential groove.

FIG. 3 illustrates a cross-sectional view of an embodiment of a piston given generally as 10. Preferably the piston 10 is a displacer, such as is used in a cryogenic refrigerator. The piston 10 includes a body 50 having a circumferential groove. The circumferential groove includes a groove wall 74 formed in the body 50. The piston 10 also includes mounted within the groove, a polymer seal ring 46, two radial springs 38a, 38b, a polymer L-ring 40, a load ring 44, and an axial biasing mechanism such as a spring 48. The design of the piston 10 allows a user to displace the spring 48 such that the spring 48 loads the seal ring 46 within a narrow load range or tolerance. Neither the load ring 44 nor the radial springs 38a, 38b are required for the practice of the invention; however each provides additional benefits in establishing a more secure seal. The load ring 44 displaces the axial load from the wave spring to uniformly distribute the axial load onto the L-seal, which distributes the axial load onto the dynamic seal ring. The radial spring helps maintain an outward radial pressure against the dynamic ring seal as the piston moves and the dynamic ring seal expands and contracts.

Figure 4A:
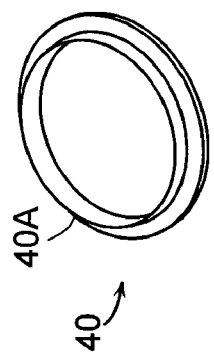
FIG. 4A is an illustration of an L-ring that may be used in an embodiment of the present invention.
Figure 4D:
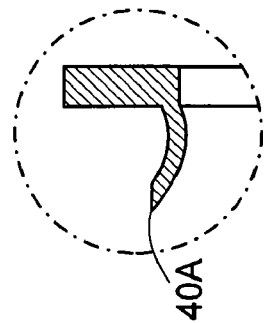
FIG. 4D is magnified view of one side of a cross-section of an L-ring shown in FIG. 4C.
Figure 4C:
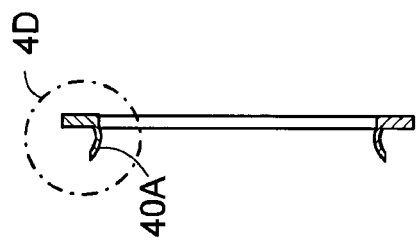
FIG. 4C is a cross-sectional view of an L-ring that may be used in an embodiment of the present invention.
Figure 4B:
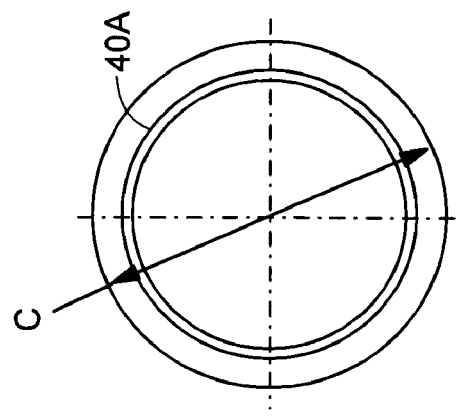
FIG. 4B is a top view of an L-ring that may be used in an embodiment of the present invention.

FIG. 4A illustrates an L-ring 40 used in an embodiment of the present invention. FIG. 4B a top view of the L-ring which shows a raised flange 40a along the interior circumference of the ring. FIG. 4C shows a cross-sectional view of the L-ring of FIG. 4B passing through line C. In FIG. 4C, the raised flange along the interior circumference can be seen as having a lip that curves slightly toward the outer circumference of the ring. In alternate embodiments, however, the raised flange does not need to be curved for the practice of the invention, and may comprise a straight edge at various angles. FIG. 4D provides a magnified view of detail D of FIG. 4C. In the enlarged view of FIG. 4D, the lip is shown to slightly extend from the interior circumference of the ring. This extension provides the line of contact against the piston body and a flexible radial fit. The bottom of the L-ring provides a flat surface against which a polymer dynamic seal will have minimal resistance in its radial movement.

Figure 5:
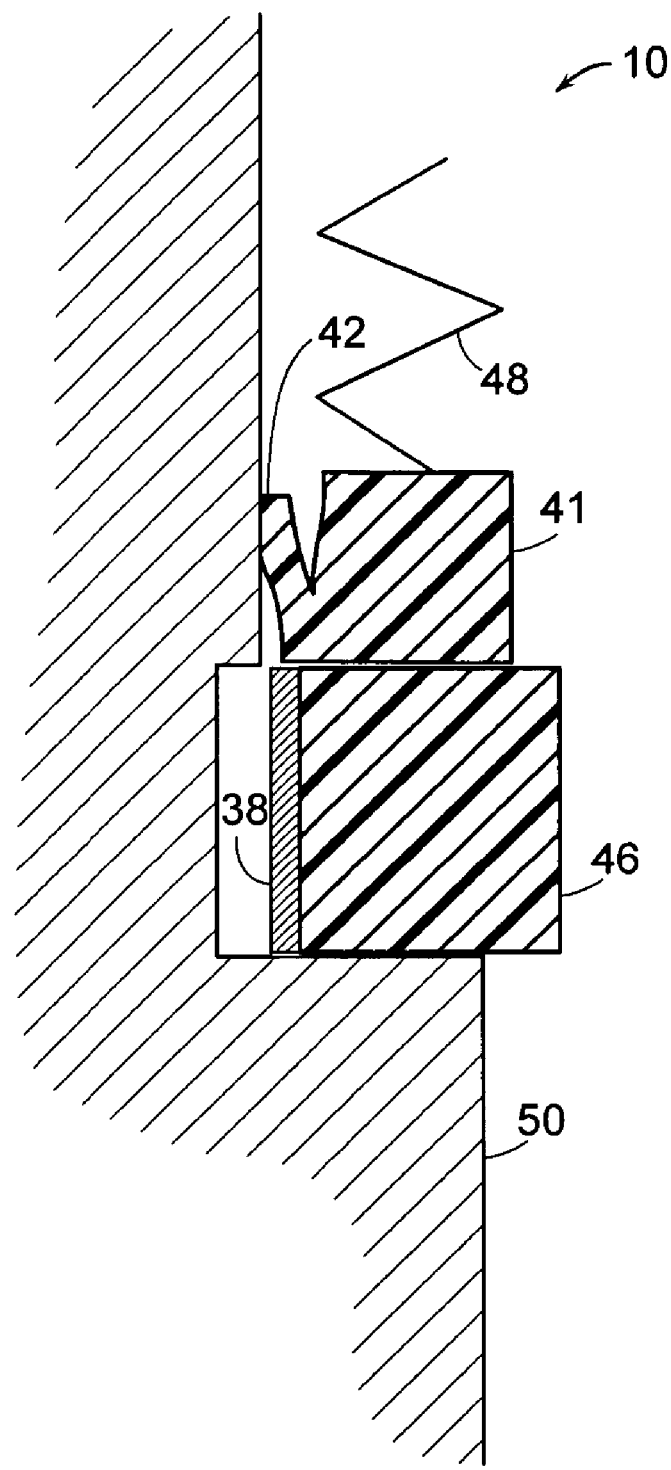
FIG. 5 is a cross-sectional view of a displacer of an alternative embodiment of the present invention and a seal ring at a circumferential groove.

FIG. 5 illustrates another embodiment of the present invention in a piston given generally as 10. The piston 10 has a dynamic seal ring 46, at least one radial spring 38, a polymer flanged load ring 41 having a flange 42 that extends toward the piston body 50, and an axial biasing mechanism such as a spring 48. As with the L-ring, the flange of the flanged load ring curves slightly toward the outer circumference of the ring, providing the line of contact against the piston body and a flexible radial fit. Again, the bottom of the flanged load ring provides a flat surface against which a polymer dynamic seal will have minimal resistance in its radial movement. The design of the piston 10 allows a user to displace the spring 48 such that the spring 48 loads the seal ring 46 within a narrow load range or tolerance.

The static seal ring, whether an L-ring 40 of FIG. 3, a flanged load ring 41 of FIG. 5, or other flanged designs, contracts to seal the outer diameter of the displacer 10, restricting the flow path through the dynamic seal ring 46, and locking the axial force on the seal ring 46 independent of the spring 48. By locking, the static seal ring prevents the spring 48 from potentially lifting while operating at cryogenic temperatures. The static seal ring 41 and the dynamic seal ring 46 abut at flat surfaces, allowing radial movement between the two rings and distributing the axial load produced by the spring 48 along the flat axial surfaces of the rings. The flat surface of the static seal provides a second sealing surface on top of the axial face of the split seal to help reduce flow through a leak path. Finally, the static L-ring or the flanged load ring relaxes the tolerance requirements of the Z-cut, reducing the cost of the seal.

In an embodiment of the present invention, both the dynamic seal 46 ring and the static seal ring, either of L-ring 40 or flanged load ring 41, are made of polymers. These seal rings form a flat polymer on polymer contact surface that allow a smooth movement between the two rings as temperatures change and the dynamic seal expands and contracts. Direct contact with a prior elastomer O-ring restricts the radial movement of the dynamic seal due to the friction between the elastomer and the polymer dynamic seal. Further, the polymer seal rings provide better durability than elastomer O-rings which may be more sensitive to damage, particularly with the great variation of extreme temperatures in a cryogenic refrigerator. Likewise, metal load rings also create restrictive friction unless the metal surface is well machined. The metal load rings also fail to provide a static seal.

Additionally, the broad range of properties of polymers allows one to tune the properties and shape of the rings to the forces one needs for a particular seal. Preferably, the polymer used for the seal rings is a halogenated or perhalogenated alkenyl or alkoxy polymer of $C_1$ to $C_4$ repeat units, including copolymers thereof, wherein the repeat units are substantially halogenated with fluorine, chlorine or combinations thereof. Suitable halogenated or perhalogenated polymers include, for example, Teflon®. (E. I. Du Pont de Nemours and Company, polytetrafluoroethylene, PTFE), Teflon®. PFA (E. I. Du Pont de Nemours and Company, Product Code 857210, perfluoroalkoxy polymer), Teflon®. FEP Green (E. I. Du Pont de Nemours and Company, Product Code 856204, fluorinated ethylene-propylene copolymers), Teflon®. FEP Black (E. I. Du Pont de Nemours and Company, Product Code 856200, fluorinated ethylene-propylene copolymers), Teflon®. ETFE clear (E. I. Du Pont de Nemours and Company, Product Code 5326010, ethylene trifluoroethylene), Teflon®. ETFE Green (E. I. Du Pont de Nemours and Company, Product Code 5326014, ethylene trifluoroethylene), Halar®. (Whitford, Product Code 6014, ethylene chlorotrifluoroethylene), Kynar®. (Ausimot, Inc., polyvinylidene fluoride) KF®. (Continental Industries, Inc., polyvinylidene fluoride) and PVF2 (Continental Industries, Inc. polyvinylidene fluoride).

While this invention has been particularly shown and described with references to preferred embodiments thereof, it will be understood by those skilled in the art that various changes in form and details may be made therein without departing from the scope of the invention encompassed by the appended claims.

What is claimed is:

1. A piston comprising:
   a piston body having a circumferential groove;
   a first seal ring located within the circumferential groove, the first seal ring forming a dynamic seal and having a flat axially facing surface;
   a second seal ring located within the circumferential groove, the second seal ring having a flat surface abutting the flat surface of the first seal ring and forming a static seal against the piston body wherein the second seal ring is an L-ring that has a flange that abuts the piston body;
   a load ring located within the circumferential groove; and
   a spring located within the circumferential groove loading one of the seal rings axially against the other.

2. The piston of claim 1 wherein the spring axially loads the load ring against the first seal ring and the second seal ring.

3. A piston comprising:
   a body having a circumferential groove;
   a first seal ring forming a dynamic seal located within the circumferential groove, the first seal ring having a flat axially facing surface and comprising at least one radial spring mounted within a polymer split seal ring to create a radial force within the split seal ring;
   a polymer L-ring forming a static seal within the circumferential groove, the L-ring having a flat surface abutting the dynamic seal and forming a static seal against the piston body;
   a load ring mounted within the circumferential groove; and
   a spring located within the circumferential groove, the spring loading the rings axially against the other.

4. A refrigerator comprising:
   a cylinder;
   a displacer mounted within the cylinder, the displacer having a body having a circumferential groove;
   a first seal ring located within the circumferential groove, the first seal ring forming a dynamic seal and having a flat axially facing surface;
   an second seal ring located within the circumferential groove, the second seal ring having a flat surface abutting the flat surface of the first seal ring and forming a static seal against the piston body wherein the second seal ring is an L-ring that has a flange that abuts the piston body;
   a load ring located within the circumferential; and
   a spring located within the circumferential groove loading one of the seal rings axially against the other.

5. The refrigerator of claim 4 wherein the spring axially loads the load ring against the first seal ring and the second seal ring.

6. A refrigerator comprising:
   a cylinder;
   a displacer mounted within the cylinder, the displacer having a body having a circumferential groove;
   a first seal ring forming a dynamic seal located within the circumferential groove, the first seal ring having a flat axially facing surface and comprising at least one radial spring mounted within a polymer split seal ring to create a radial force within the split seal ring;

a polymer L-ring forming a static seal within the circumferential groove, the L-ring having a flat surface abutting the dynamic seal and forming a static seal against the piston body;

a load ring located within the circumferential groove; and a spring located within the circumferential groove, the spring loading the rings axially against each other.

7. A method for securing a seal ring within a piston comprising:

providing a piston having a body having a circumferential groove and a sleeve mounted on the body;

providing a dynamic seal ring against the first groove wall of the piston, the seal ring having a flat axially facing surface;

providing a static seal L-ring within the circumferential groove, the static seal ring having a flat surface abutting the flat surface of the first seal ring and forming a static seal against the piston body;

providing a spring within the circumferential groove;

compressing the spring with a sleeve to axially load the static seal against the dynamic seal ring; and attaching the sleeve to the body to maintain the compression of the spring.

8. The method of claim 7 further comprising providing a load ring between the L-ring and the spring.

9. A method for securing a seal ring within a piston comprising:

providing a piston having a body having a circumferential groove and a sleeve mounted on the body;

providing a dynamic seal ring against the first groove wall of the piston, the seal ring having a flat axially facing surface;

providing a static seal ring within the circumferential groove, the static seal ring having a flat surface abutting the flat surface of the first seal ring and forming a static seal against the piston body wherein the static seal ring is a flanged load ring having a flange that abuts the piston body;

providing a spring within the circumferential groove;

compressing the spring with a sleeve to axially load the static seal against the dynamic seal ring; and attaching the sleeve to the body to maintain the compression of the spring.

10. A method for securing a seal ring within a piston comprising:

providing a piston having a body having a circumferential groove and a sleeve mounted on the body;

providing a polymer dynamic seal ring against the first groove wall of the piston, the seal ring having a flat axially facing surface;

providing a polymer static seal ring within the circumferential groove, the static seal ring having a flat surface abutting the flat surface of the first seal ring and forming a static seal against the piston body;

providing a spring within the circumferential groove;

compressing the spring with a sleeve to axially load the static seal against the dynamic seal ring; and attaching the sleeve to the body to maintain the compression of the spring.

11. A method for securing a seal ring within a piston comprising:

providing a piston having a body having a circumferential groove and a sleeve mounted on the body;

providing a dynamic polymer seal ring against the first groove wall of the piston, the dynamic seal ring having a flat axially facing surface and comprising at least one radial spring mounted within a polymer split seal ring to create a radial force within the split seal ring;

providing a static polymer seal ring within the circumferential groove, the static seal ring having a flat surface abutting the flat surface of the dynamic polymer seal ring and forming a static seal against the piston body;

providing a spring within the circumferential groove;

compressing the spring with a sleeve to axially load the static seal against the dynamic seal ring; and attaching the sleeve to the body to maintain the compression of the spring.

12. A method for securing a seal ring within a piston comprising:

providing a piston having a body having a circumferential groove and a sleeve mounted on the body;

providing a dynamic polymer seal ring against the first groove wall of the piston, the dynamic seal ring having a flat axially facing surface and comprising at least one radial spring mounted within a polymer split seal ring to create a radial force within the split seal ring;

providing a static polymer flanged load ring having a flange that abuts the piston body within the circumferential groove, the flanged load ring having a flat surface abutting the flat surface of the dynamic seal ring and forming a static seal against the piston body;

providing a spring within the circumferential groove;

compressing the spring with a sleeve to axially load the static seal against the dynamic seal ring; and attaching the sleeve to the body to maintain the compression of the spring.

* * * * *